United States Patent
Konishi et al.

(10) Patent No.: US 7,586,537 B2
(45) Date of Patent: Sep. 8, 2009

(54) DOME TYPE CAMERA

(75) Inventors: Takayuki Konishi, Kanagawa (JP); Toshikazu Tatewaki, Kanagawa (JP)

(73) Assignee: Panasonic Corporation, Osaka (JP)

( * ) Notice: Subject to any disclaimer, the term of this patent is extended or adjusted under 35 U.S.C. 154(b) by 433 days.

(21) Appl. No.: 10/597,156

(22) PCT Filed: Jan. 27, 2005

(86) PCT No.: PCT/JP2005/001100

§ 371 (c)(1), (2), (4) Date: Jul. 13, 2006

(87) PCT Pub. No.: WO2005/076068

PCT Pub. Date: Aug. 18, 2005

(65) Prior Publication Data

US 2008/0231699 A1 Sep. 25, 2008

(30) Foreign Application Priority Data

Feb. 4, 2004 (JP) .............................. 2004-028164

(51) Int. Cl.
H04N 5/225 (2006.01)
(52) U.S. Cl. ...................... 348/373; 348/374; 348/375; 348/143; 348/151; 396/419; 396/427
(58) Field of Classification Search .................. 348/373, 348/375, 151, 143, 374; 396/419, 427
See application file for complete search history.

(56) References Cited

U.S. PATENT DOCUMENTS

| 4,062,267 | A | * | 12/1977 | Vinches et al. ............. 89/41.19 |
| 4,232,361 | A | * | 11/1980 | Kelsall ....................... 362/364 |
| 4,736,218 | A | * | 4/1988 | Kutman ...................... 396/427 |
| 2001/0018997 | A1 | * | 9/2001 | Suganuma .................. 188/2 F |
| 2003/0128131 | A1 | * | 7/2003 | Skiver et al. ............. 340/815.4 |
| 2003/0156832 | A1 | * | 8/2003 | Nomura et al. ............... 396/72 |
| 2003/0172771 | A1 | * | 9/2003 | Nanko et al. ................ 74/594.2 |
| 2004/0093799 | A1 | * | 5/2004 | Yoshikawa et al. ............ 49/192 |
| 2006/0017842 | A1 | * | 1/2006 | Jun ............................. 348/373 |

FOREIGN PATENT DOCUMENTS

| JP | 3-130683 | 12/1991 |
| JP | 9-214810 | 8/1997 |
| JP | 2000-155366 | 6/2000 |
| JP | 2003-174572 | 6/2003 |
| JP | 2002-359770 | 12/2003 |
| JP | 2004-214725 | 7/2004 |

* cited by examiner

*Primary Examiner*—David L Ometz
*Assistant Examiner*—Quang V Le
(74) *Attorney, Agent, or Firm*—Pearne & Gordon LLP

(57) ABSTRACT

The lens moving mechanism may be a cam structure. The cam structure is set so that the rotation axis of the lens is held at the center of the dome in a predetermined center hold angle range corresponding to the direction of an elevation angle, and that the rotation axis of the lens is moved from the center of the dome in the zenith direction at angles lower than the center hold angle range. Good images can be obtained even when shooting in the direction of a depression angle.

4 Claims, 7 Drawing Sheets

TILT ANGLE OF 90 DEGREES

CENTER HOLD ANGLE RANGE A

TILT ANGLE OF 75 DEGREES

TILT ANGLE OF 90 DEGREES

DOME TYPE CAMERA

TECHNICAL FIELD

The present invention relates to a dome type camera comprising a lens rotatable in a tilt direction.

BACKGROUND ART

A conventional dome type camera comprises a hemispheric dome cover, and a lens provided inside the dome cover rotatably in tilt and pan directions. They are placed so that the center of rotation of the lens is on the optical axis and corresponds to the center of the dome cover, and this placement provides good images. Such a dome type camera is disclosed, for example, in Japanese published patent application No. 2000-155366 (abstract and FIG. 4).

However, the conventional dome type camera produces vignetting and cannot obtain good images when shooting in the direction of a depression angle.

By the way, the direction of a depression angle is a downward direction with reference to the horizontal direction, provided that the zenith direction of the dome is the upward direction. Accordingly, for example, if a dome type surveillance camera is installed with the dome facing upward, the direction of a depression angle is a downward direction with reference to the horizontal. If the camera is installed on a wall with the dome facing sideways, the direction of a depression angle is a direction toward the wall with reference to the downward direction. Incidentally, vignetting refers to a partial darkening of an image due to a camera case being in part of a shooting area.

As mentioned above, the conventional camera produces vignetting when shooting in the direction of a depression angle. Consequently, for example, it has not been easy to respond to the need to shoot around the place where the camera is mounted and to obtain good images therefrom.

DISCLOSURE OF THE INVENTION

Problems to be Solved by the Invention

A purpose of the invention made in the above-mentioned background is to provide a dome type camera capable of obtaining good shot images in the direction of a depression angle.

Means for Solving the Problems

An aspect of the invention is a dome type camera, which comprises: a dome cover; a lens provided inside the dome cover rotatably in a tilt direction; and a lens support structure supporting the lens so that a center of rotation of the lens can be moved from a center of a dome to a position apart therefrom in a zenith direction.

Another aspect of the invention is a camera, which comprises: a lens provided rotatably in a tilt direction; a lens support structure supporting the lens so that a center of rotation of the lens can be moved; and a lens moving mechanism for moving the lens according to a rotation of the lens in the tilt direction. This aspect is not limited to a dome type camera, but may include a camera not comprising a dome. In this aspect, the direction of movement of the lens is a direction in which a camera housing, as an obstructing part of the camera itself that causes vignetting, is left out of a shooting area. In an embodiment, the direction of movement of the lens is a direction away from a base section, and is also a direction of a pan axis in a camera capable of pan and tilt.

There are other aspects of the invention as described below. This disclosure of the invention therefore intends to provide part of aspects of the invention and does not intend to limit the scope of the invention described and claimed herein.

DESCRIPTION OF THE SYMBOLS

Figure 1:
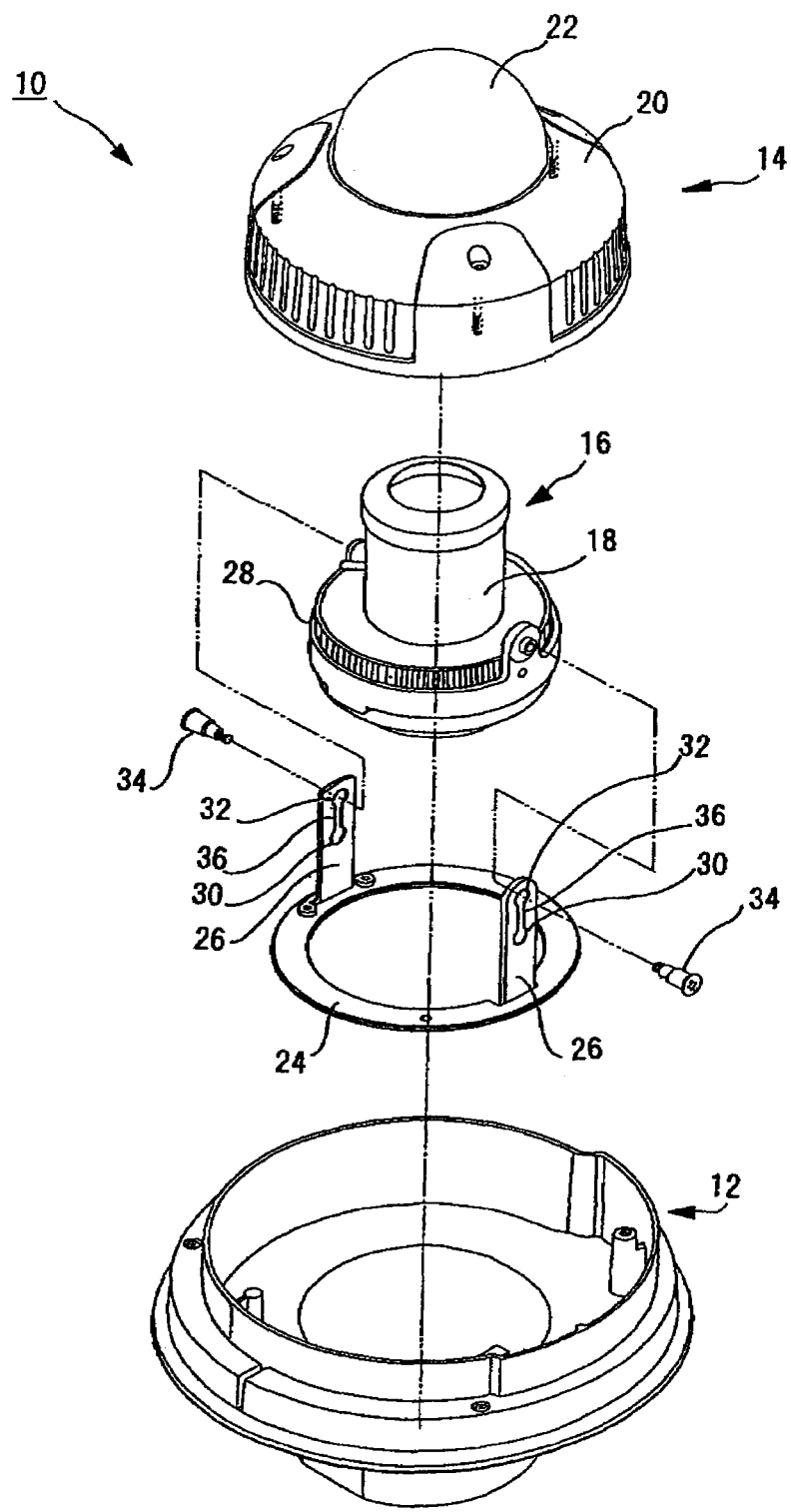
FIG. 1 shows a dome type camera according to a first embodiment of the invention.

10, 50: dome type camera
12: base
14: cover
16: lens
22: dome cover
24: pan section
26: support wall
30: first mounting hole
32: second mounting hole
34: shoulder screw
52: pan section
54: support wall
60: plate cam
62: pressing piece A: center hold angle range

BEST MODE OF EMBODYING THE INVENTION

Now, the invention will be described in detail. However, the following detailed description and appended drawings are not intended to limit the invention. Alternatively, the scope of the invention is defined by the appended claims.

A dome type camera of the embodiment comprises: a dome cover; a lens provided inside the dome cover rotatably in a tilt direction; and a lens support structure supporting the lens so that a center of rotation of the lens can be moved from a center of a dome to a position apart therefrom in a zenith direction (a direction of the zenith).

In this configuration, the camera can shoot in the direction of a depression angle in a state where the center of tilt rotation of the lens is moved from the center of the dome cover in the zenith direction, thus obtaining good images in the direction of a depression angle.

This dome type camera also comprises a lens moving mechanism for moving the lens in the zenith direction according to a rotation of the lens in the tilt direction.

In this configuration, the lens can be moved to a suitable position for obtaining good images, according to a change in the direction of the lens.

In this dome type camera, the lens moving mechanism comprises a cam for moving a rotation axis to a predetermined position according to a rotation of the lens.

In this configuration, the provided cam allows the center of tilt rotation of the lens to be moved between the center of the dome and a position apart therefrom in the zenith direction so that good images can always be obtained according to a rotation of the lens.

The cam is set so that the rotation axis of the lens is held at the center of the dome in a predetermined center hold angle range corresponding to a direction of an elevation angle, and that the rotation axis of the lens is moved from the center of the dome in the zenith direction at angles lower than the center hold angle range.

In this configuration, good images can be obtained with the tilt rotation axis of the lens being held at the center of the dome cover in the above center hold angle range.

The cam is a plate cam attached to the rotation axis, and a cam surface around a periphery of the plate cam is in contact with a fixed pressing section.

In this configuration, an appropriate cam structure can be provided with the simple configuration.

The above dome type camera has the above configuration, in which the lens is supported so that it can be moved from the position where the center of rotation of the lens corresponds to the center of the dome cover to the position apart therefrom in the zenith direction. The dome type camera can therefore shoot in the direction of a depression angle in a state where the center of rotation is moved from the center of the dome cover in the zenith direction. Such a dome type camera carries the advantage that good images can be obtained in the direction of a depression angle.

In another aspect, the embodiment discloses a camera. This camera comprises: a lens provided rotatably in a tilt direction; a lens support structure supporting the lens so that a center of rotation of the lens can be moved; and a lens moving mechanism for moving the lens according to a rotation of the lens in the tilt direction. In this aspect, the camera is not limited to a dome type camera, and therefore may include a camera not comprising a dome. In this aspect, the direction of movement of the lens is a direction in which a camera housing, as an obstructing part of the camera itself that causes vignetting, is left out of a shooting area. In the following embodiment, the direction of movement of the lens is a direction away from a base section, and is also a direction of a pan axis in a camera capable of pan and tilt.

In this configuration, the camera can shoot in the direction of a depression angle in a state where the center of rotation of the lens is moved. The lens can be moved to a suitable position for obtaining good images, according to a change in the direction of the lens. Consequently, good images can be obtained in the direction of a depression angle.

Now, the dome type camera of the embodiment of the invention will be described with reference to the drawings.

FIG. 1 shows a dome type camera of a first embodiment of the invention. In the embodiment, the dome type camera 10 is a surveillance camera. In the embodiment, in a state where the zenith of the dome faces upward as shown in FIG. 1, the upward direction is referred to as the zenith direction and the lateral direction is referred to as the horizontal direction. The direction of the camera lens is expressed with reference to the horizontal direction, and an angle upward from the horizontal direction is referred to as an elevation angle, while an angle downward from the horizontal direction is referred to as a depression angle. The lens angle of the horizontal direction is 0, and the lens angle of the zenith direction is 90 degrees.

In FIG. 1, the dome type camera 10 comprises a base 12 and a cover 14 which form a housing. The base 12 is generally circular, and has a mounting structure for a ceiling or other installation locations. The base 12 also rotatably supports a lens 16. The lens 16 is held by a lens barrel 18, at a rear end of which an imaging device is provided, and they form the camera.

The cover 14 has a ring section 20, to which a dome cover 22 is attached with a screw. The ring section 20 has a mounting structure for the base 12. The dome cover 22 is a window member, which is made of clear plastic. As shown in the figure, the dome cover 22 is shaped so that the lens 16 is housed in the dome cover 22 when the cover 14 is attached to the base 12. The lens 16 is thus placed inside the window member.

A pan-tilt mechanism, which is a support structure of the lens 16, will be described next. The lens 16 is supported rotatably in pan and tilt directions as mentioned below. Particularly, in the embodiment, the lens 16 is supported so that the center of rotation can be moved from the center of the dome to a position apart therefrom in the zenith direction.

In FIG. 1, as the support structure of the lens 16, a pan section 24 is provided on the base 12 rotatably in the horizontal plane. The pan section 24 is made from a thin sheet and has a ring shape. Support walls 26 are provided to stand at two positions 180 degrees apart from each other on the pan section 24. Between the two support walls 26, the lens 16 is mounted rotatably in the tilt direction. The lens 16 is manually rotated in the pan and tilt directions. On the lens 16, an azimuth section 28 is provided for correcting a change in the angle of a shooting area associated with pan and tilt, and the azimuth section 28 is also moved manually.

Each of the support walls 26 is provided with two mounting holes, i.e. a first mounting hole 30 and a second mounting hole 32. A shoulder screw (screw having a shoulder) 34 is threaded through one of the first mounting hole 30 and the second mounting hole 32, and is then tightened to the lens 16. This allows the shoulder screw 34 to be a tilt rotation axis, and the lens 16 is supported rotatably in the tilt direction. A tapped hole in the lens 16 is placed so that its center line intersects with the optical axis.

The first mounting hole 30 and the second mounting hole 32 are provided at different heights. The first mounting hole 30 is provided at the place where it corresponds to the center of the dome when the pan section 24 is attached to the base section 12. That is, if a straight line is drawn between the centers of the first mounting holes 30 of the two support walls 26, the line passes through the center of the hemisphere of the dome cover 22.

The second mounting hole 32 is positioned higher than the first mounting hole 30, that is to say, positioned above the center of the dome toward the zenith. The second mounting hole 32 is provided at a height where vignetting does not occur when the camera shoots in the direction of a depression angle using the lens 16 as described below.

The first mounting hole 30 and the second mounting hole 32 are the same size. As shown in the figure, the first mounting hole 30 and the second mounting hole 32 are linked to each other by a slit 36 having a width smaller than the hole diameter.

Figure 2:
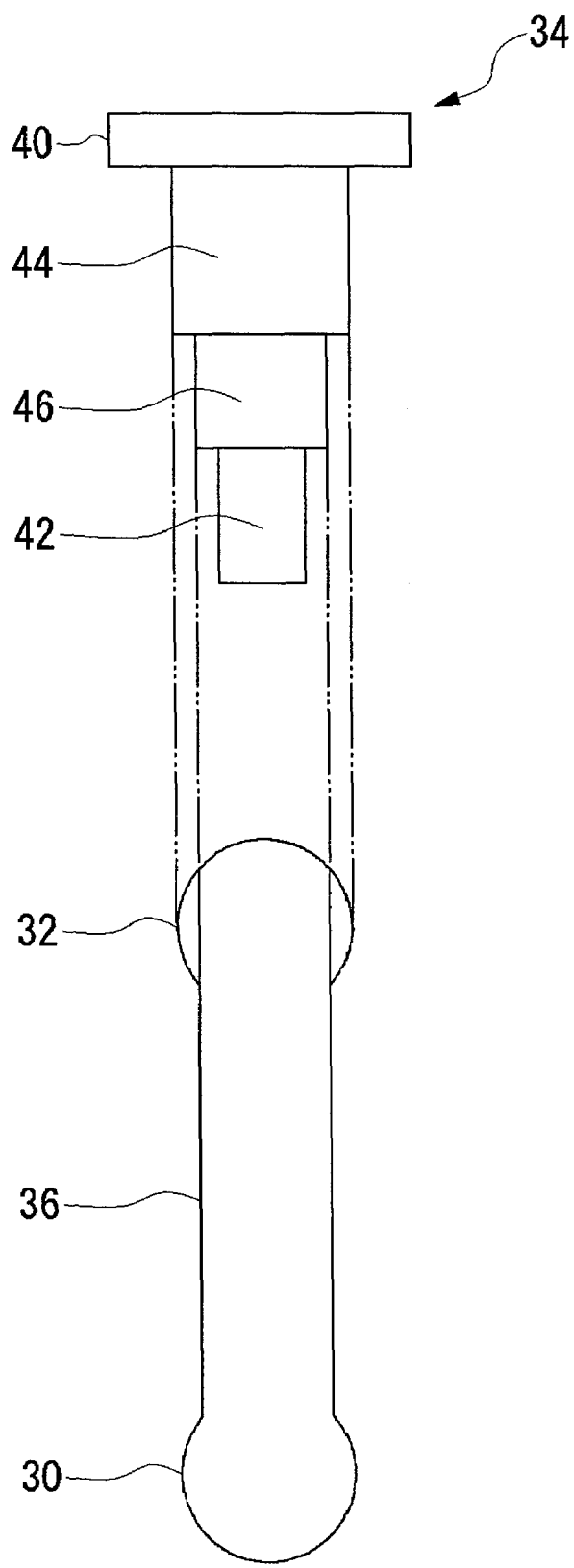
FIG. 2 shows a shoulder screw for attaching a lens.

FIG. 2 shows the shoulder screw 34, which has a large diameter section 44 and a small diameter section 46 between a head section 40 and a thread section 42. The small diameter section 46 adjoins the large diameter section 44 on the front end thereof. The large diameter section 44 and the small diameter section 46 are both circular in cross section.

The diameter of the large diameter section 44 is almost the same as the inside diameter of the first mounting hole 30 and the second mounting hole 32, but is slightly smaller than the first mounting hole 30 and the second mounting hole 32. The large diameter section 44 therefore becomes the rotation axis of the lens 16 when the shoulder screw 34 is tightened.

The diameter of the small diameter section 46 is provided slightly smaller than the slit 36. The small diameter section 46 can be passed through the slit 36 in a state where the shoulder screw 34 is loosened but not removed. The shoulder screw 34 can thus be moved from the first mounting hole 30 to the second mounting hole 32, or in the opposite direction. In this way, the lens 16 can be moved and the height thereof can be changed.

An assembly method of the dome type camera 10 of the embodiment will be described next. As shown in FIG. 1, the pan section 24 is attached to the base 12, and the lens 16 is mounted between the two support walls 26 of the pan section 24. At this time, each of the two shoulder screws 34 is threaded from the outside either through the first mounting hole 30 or through the second mounting hole 32 of the support wall 26 on both sides, and is tightened to the tapped hole in the lens 16. The lens 16 is then rotated so that it faces in a desired shooting direction, and additionally an azimuth adjustment is performed.

Here, the first mounting hole 30 or the second mounting hole 32 is chosen as follows. First, a case where a tilt angle is relatively small is described. In this case, the elevation angle from the horizontal direction is relatively large, and there is no vignetting trouble. The first mounting hole 30 is chosen in this case. Basically, the first mounting hole 30 is chosen by priority. Since the center of rotation is on the optical axis of the lens 16, the optical axis passes through the center of the dome, and therefore good images can be obtained. By the way, in the specification, the tilt angle is 0 degree when the lens 16 faces the zenith (the tilt angle is 0 degree when the lens angle is 90 degrees).

A case where a tilt angle is large is described next. In this case, the elevation angle is small even if the shooting direction is upward. Alternatively, the shooting direction is in the horizontal direction or in the direction of a depression angle. The use of the first mounting hole 30 causes vignetting in this case. As described before, vignetting refers to a partial darkening of an image due to a camera case being in part of a shooting area. The second mounting hole 32 is therefore chosen in such a case. This allows the center of rotation of the lens 16 to be positioned high, thus preventing vignetting.

Figure 3:
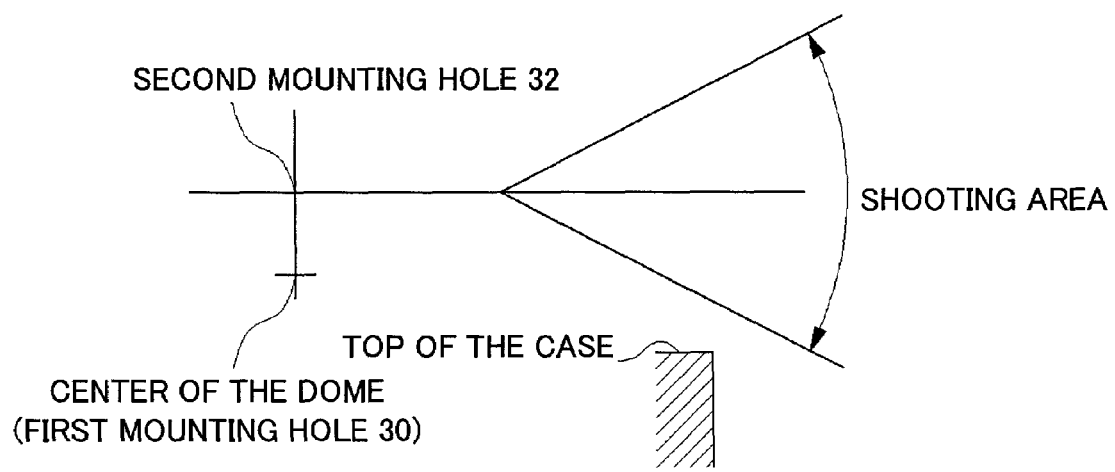
FIG. 3 shows a shooting area for when the lens is rotated.

FIG. 3 shows an example of a shooting area for when the second mounting hole 32 is chosen. Since the dome type camera 10 of the embodiment is a surveillance camera, the shooting area is a surveillance area. In this example, the shooting direction is horizontal, and half of the shooting area is in the direction of a depression angle. As shown in the figure, the high-positioned center of rotation leaves the camera case (the top of the ring section 20 of the cover 14) out of the shooting area, thus preventing vignetting.

Returning to FIG. 1, the cover 14 is attached in a state where the lens 16 is pointed in a desired direction, and the dome type camera 10 is thus completed. Orientation adjustment of the lens 16 and the fitting of the cover 14 may be done in a state where the base 12 is installed on a ceiling or other installation locations.

Described next is an operation of height adjustment of the lens 16 for when the dome type camera 10 is already assembled. In this case, the cover 14 is detached and the direction of the lens 16 is changed manually.

Suppose that the lens 16 is mounted to the first mounting hole 30 of the support wall 26 of the pan section 24 before the adjustment. In this case, the center of rotation of the lens 16 corresponds to the center of the dome. Also suppose that the lens 16 is rotated so that it faces in the direction of a small elevation angle, in the horizontal direction, or in the direction of a depression angle. As an example here, the lens 16 is pointed in the horizontal direction. When the lens 16 is pointed in the horizontal direction, the shooting area will cover the direction of a depression angle.

So, the shoulder screw 34 is loosened but not removed, and the lens 16 is moved in the zenith direction. The small diameter section 46 of the shoulder screw 34 is passed through the slit 36 of the support wall 26, and the shoulder screw 34 is moved to the second mounting hole 32. The shoulder screw 34 is tightened again, and the large diameter section 44 of the shoulder screw 34 is supported as an axis in the second mounting hole 32. The lens 16 is then pointed in the horizontal direction. A rotation in the pan direction and azimuth adjustment are also performed as required.

The first embodiment of the invention has been thus far described. In the embodiment, since the center of rotation of the lens 16 is supported so that the center of rotation can be moved from the center of the dome in the zenith direction, the camera can shoot in the direction of a depression angle in a state where the center of rotation of the lens 16 is positioned apart from the center of the dome cover in the zenith direction. This reduces vignetting and provides good and fine images in the direction of a depression angle.

Also in the embodiment, the center of rotation of the lens 16 can be held at the center of the dome for a usual shooting direction that does not include the direction of a depression angle. Good images can thus be obtained with the center of the dome positioned on the optical axis. After all, the camera can shoot in the direction of a depression angle while maintaining image quality in the usual shooting direction.

In the embodiment, image quality can also be improved for shooting in the direction of a depression angle, compared to a conventional configuration described as follows. Conventionally, in a certain type of camera, a cover has a shape in which a cylindrical transparent cover is combined with a hemispherical dome at the bottom thereof. Such a camera can shoot in the direction of a depression angle through the cylindrical part. However, in this case, images are obtained through the cylindrical part, which is a two-dimensional curved surface. Image quality of such images is by far lower than that of images obtained through a spherical surface, which is a three-dimensional curved surface. For this reason, Image quality severely deteriorates when shooting in the direction of a depression angle.

The conventional configuration has thus had a considerable disadvantage in image quality since the camera shoots in the direction of a depression angle through the cylindrical section, which is a two-dimensional curved surface. On the other hand, since the embodiment enables shooting through a spherical surface, which is a three-dimensional curved surface, image quality improves compared to shooting through the cylindrical section. The point is that the embodiment provides good images even when shooting in the direction of a depression angle, if compared to the above conventional configuration.

Now, a dome type camera of a second embodiment of the invention will be described.

Figure 4:
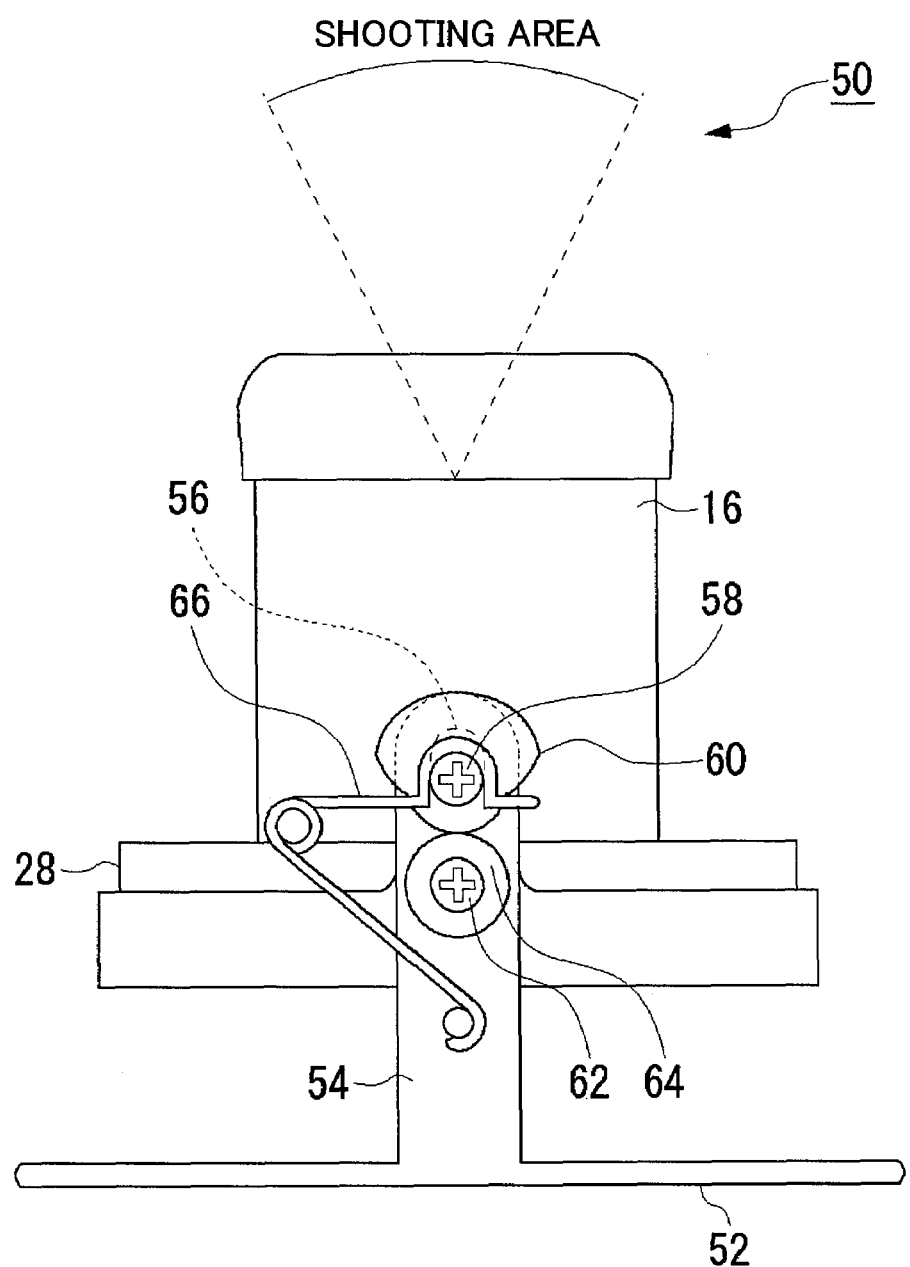
FIG. 4 shows a dome type camera according to a second embodiment of the invention.
Figure 5:
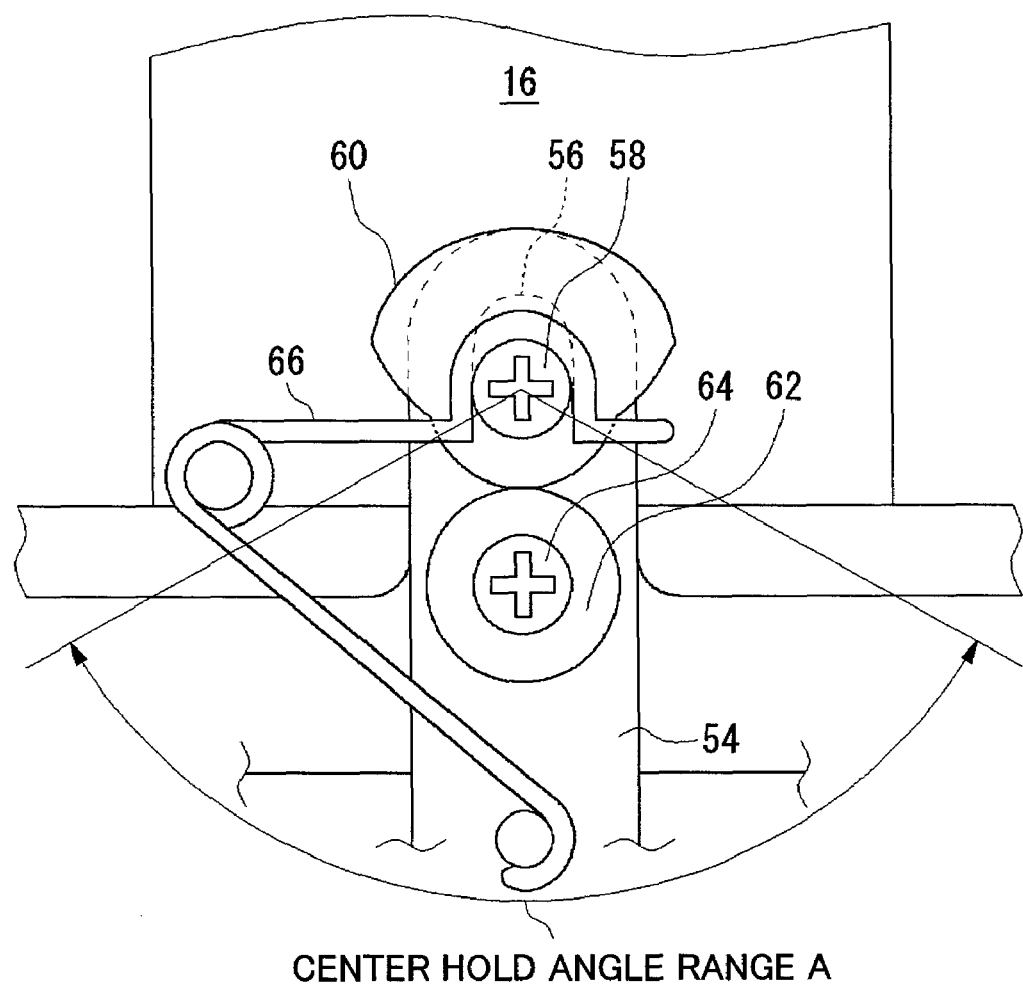
FIG. 5 is a magnified view of a cam structure part according to the second embodiment of the invention.

FIG. 4 shows a lens support mechanism of the dome type camera of the embodiment. FIG. 5 is a partial magnified view of FIG. 4. As described below, the dome type camera 50 of the embodiment comprises a cam mechanism as a lens moving mechanism for moving the lens 16 up and down according to the rotation of the lens 16 in the tilt direction. The configuration not shown in the figure such as a base, a cover, and others may be the same as that of the above-described first embodiment, and the description thereof is omitted.

In FIGS. 4 and 5, a pan section 52 is a ring-shaped thin sheet as is the case with the first embodiment. The pan section 52 is provided with two support walls 54 to stand thereon. The support wall 54 is provided with a slot 56. The lens 16 is rotatably mounted to the slot 56 with a screw 58 so that the lens can be moved up and down in the slot 56.

Though not shown in the figure, the screw 58 has a cylindrical axis section between the head and the thread section. This cylindrical axis section functions as the rotation axis as is the case with the first embodiment. The center line of a tapped hole in the lens 16 is positioned where it intersects with the optical axis of the lens 16. When the screw 58 is positioned at the bottom of the slot 56, the center line of the screw 58 passes through the center of the dome, the rotation axis therefore passes through the center of the dome, and the optical axis of the lens 16 passes through the center of the dome. The screw 58 can be moved with the lens 16 upward from the position in FIGS. 4 and 5. Incidentally, for an easy understanding of the invention, the screw 58 is simplified and the head of the screw 58 is drawn smaller in FIGS. 4 and 5.

A plate cam 60 is attached to the screw 58. The plate cam 60 is secured to the screw 58 and rotates with the screw 58 and the lens 16. A pressing piece 62 is fixed with a screw 64 to the support wall 26 at the position where the pressing piece 62 comes in contact with the plate cam 60. The pressing piece 62 is a disk rotatable around the screw 64 as an axis. A peripheral surface of the pressing piece 62 is in contact with a peripheral surface of the plate cam 60.

In addition, a torsion spring 66 is attached to the support wall 26. One end of the torsion spring 66 is attached to the support wall 26 below the pressing piece 62. The other end of the torsion spring 66 is attached to the screw 58. The torsion spring 66 biases the screw 58 and, therefore, the lens 16 downward.

Though not shown in the figure, the support wall 26 on the opposite side is also provided with a cam structure of the same kind.

A cam setting of the embodiment will be described next. As mentioned below, the cam of the embodiment is set so that the rotation axis of the lens 16 is held at the center of the dome in a predetermined center hold angle range A corresponding to the direction of an elevation angle, and that the rotation axis of the lens 16 is moved from the center of the dome in the zenith direction at angles lower than the center hold angle range A.

That is, in FIGS. 4 and 5, the lens 16 faces in the zenith direction, the tilt angle is 0 degree, and the elevation angle is 90 degrees (maximum). The cam plate 60 is circular in the center hold angle range A including the lowest point (point of contact with the pressing piece 62) in this state. In this center hold angle range A, the cam plate 60 positions the rotation axis of the lens 16 at the bottom of the slot 56. In other words, the cam plate 60 positions the rotation axis at the center of the dome. The center hold angle range A corresponds to a direction where the tilt angle of the lens 16 is small and the elevation angle is large. The center hold angle range A is also set not to produce vignetting even if the rotation axis of the lens 16 is at the center of the dome.

Furthermore, the cam plate 60 is extended in the radial direction outside the center hold angle range A. This allows the cam plate 60 to be set so that it moves the rotation axis of the lens 16 from the center of the dome in the zenith direction. The outside of the center hold angle range A is where the tilt angle is large and the angle with reference to the horizontal direction is small. In order to prevent vignetting no matter where the lens 16 faces, the cam surface is set so that the rotation axis is moved upward as the tilt of the lens 16 increases.

Described next is an operation of a pan-tilt mechanism of the dome type camera 50 of the embodiment. The pan-tilt mechanism of the embodiment is a manual system as is the case with the previously-described first embodiment. The direction of the lens 16 can therefore be changed by hand. As for the pan direction, the pan section 24 is rotated by hand. As for the tilt direction, the lens 16 is rotated by hand relative to the pan section 24. An azimuth adjustment too is performed by hand by rotating the lens 16 around the optical axis.

Taking a look now at the rotation in the tilt direction, the lens 16 faces in the zenith direction in the state of FIG. 4. At this time, the lens 16 is within the center hold angle range A. The torsion spring 66 presses down the screw 58 and, therefore, the lens 16. The circular section (fan-shaped section) of the plate cam 60 is in contact with the pressing piece 62, the screw 58 is positioned at the bottom of the slot 56, and the center of rotation corresponds to the center of the dome.

Suppose that the lens 16 is rotated from this state in the tilt direction. While the direction of the lens 16 is within the center hold angle range A, the circular section of the plate cam 60 is in contact with the pressing piece 62. The height of the lens 16 is maintained, and the center of rotation is held at the center of the dome. When the direction of the lens 16 exceeds the center hold angle range A, the lens 16 is moved in the zenith direction according to the cam surface.

Figure 6:
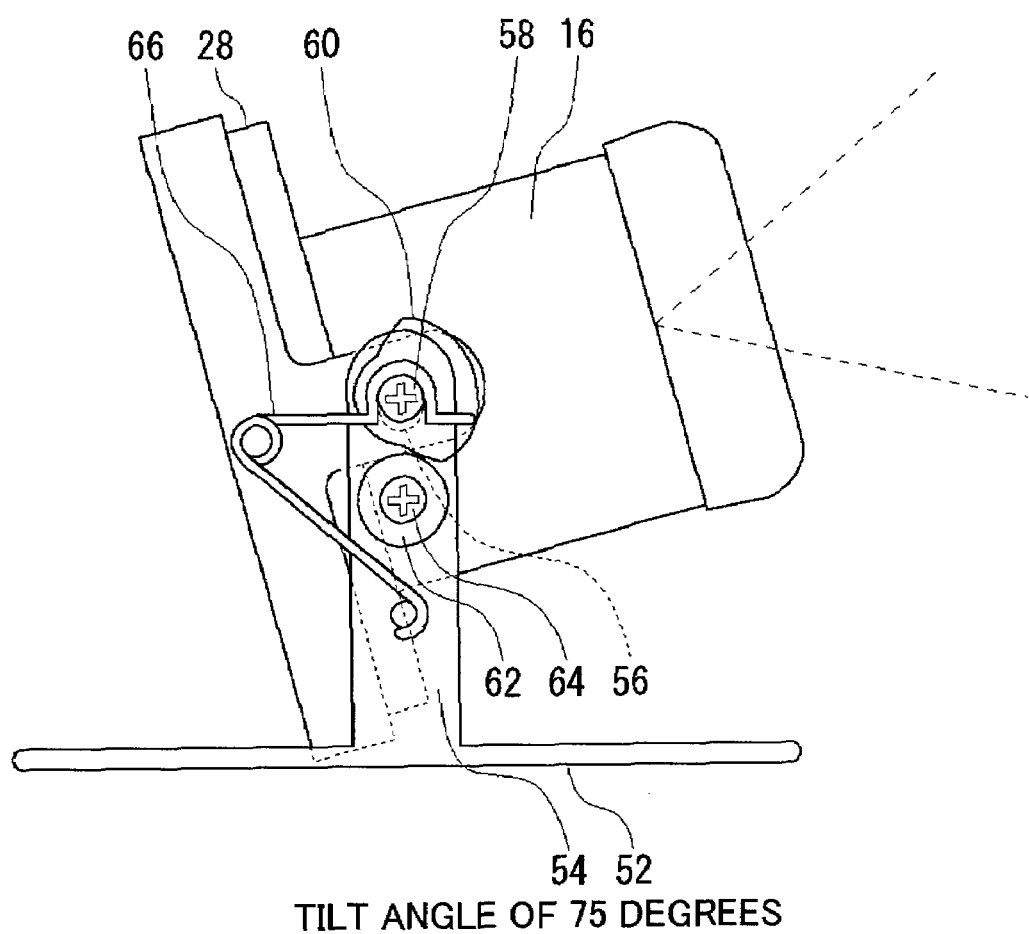
FIG. 6 shows the dome type camera for when a lens is rotated to a tilt angle of 75 degrees.

FIG. 6 shows a state where the tilt angle is 75 degrees, that is, the elevation angle is 15 degrees. The section extended from the circular section of the plate cam 60 is in contact with the pressing piece 62. The screw 58 and, therefore, the lens 16 are pushed up in the slot 56.

Figure 7:
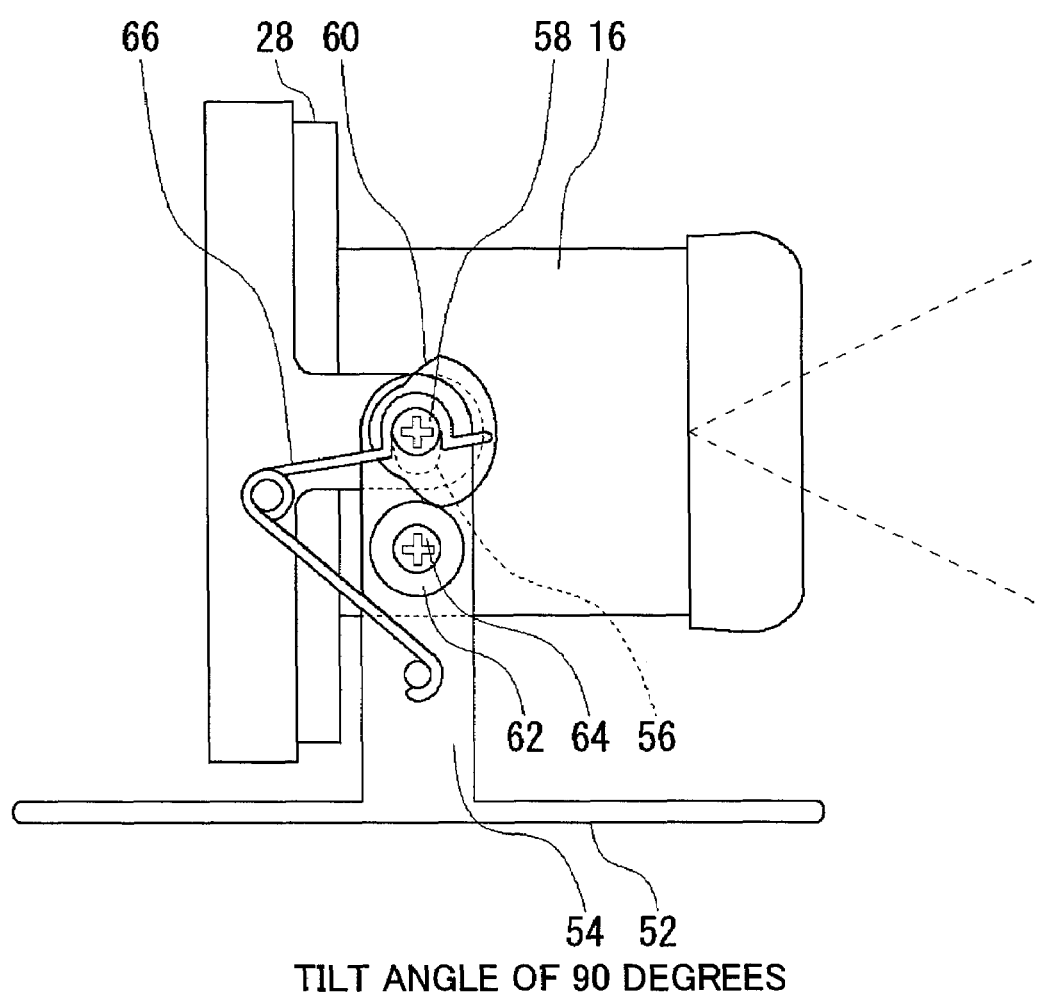
FIG. 7 shows the dome type camera for when the lens is rotated to a tilt angle of 90 degrees.

FIG. 7 shows a state where the lens 16 is further rotated to face in the horizontal direction (the tilt angle is 90 degrees and the elevation angle is 0 degree). In this state, half of the shooting area (surveillance area) is in the direction of a depression angle. In this state, the screw 58 and, therefore, the lens 16 are pushed up further in the slot 56.

In this way, in the embodiment, when the lens 16 is tilted over the center hold angle range A, the cam pushes up the rotation axis of the lens 16.

If the lens 16 is rotated in the opposite direction, the lens is moved according to the cam as well, and is moved downward. When the direction of the lens 16 comes within the center hold angle range A, the screw 58 is positioned at the bottom of the slot 56, and the rotation axis of the lens 16 corresponds to the center of the dome.

As described above, the dome type camera 50 of the second embodiment of the invention comprises the lens moving mechanism for moving the lens 16 in the zenith direction according to a rotation of the lens 16 in the tilt direction, and therefore the lens 16 can be moved to a suitable position for obtaining good and fine images, according to a change in the direction of the lens 16.

The dome type camera 50 of the embodiment also comprises the cam for moving the rotation axis to a predetermined position according to a rotation of the lens 16. The cam can move the center of rotation of the lens 16 between the center of the dome and a position apart therefrom in the zenith direction so that good images can always be obtained according to a rotation of the lens 16.

The above cam is set so that the rotation axis of the lens 16 is held at the center of the dome in the predetermined center hold angle range A corresponding to the direction of an elevation angle, and that the rotation axis of the lens 16 is moved from the center of the dome in the zenith direction at angles lower than the center hold angle range A. The cam setting being like this can hold the rotation axis of the lens 16 at the center of the dome cover 22 in the above-mentioned center hold angle range A to provide good images.

Additionally, the above cam comprises the plate cam 60 attached to the rotation axis, and the cam surface around a periphery of the plate cam 60 is in contact with the rotatably-fixed pressing piece 62. In such a simple configuration, an appropriate cam structure can thus be, and is, provided.

In the above embodiment, in another point of view, the lens 16 is supported so that the center of rotation in the tilt direction of the lens 16 can be moved. The lens 16 is moved according to a rotation in the tilt direction. Consequently, the camera can shoot in the direction of a depression angle in a state where the center of rotation of the lens 16 is moved. The lens 16 can be moved to a suitable position for obtaining good images, according to a change in the direction of the lens 16. As a result, good images can be obtained in the direction of a depression angle. In this point of view, the invention is not limited to a dome type camera, and a dome is not required to be provided in the invention.

While there has been described what are at present considered to be preferred embodiments of the invention, it will be understood that various modifications may be made thereto, and it is intended that appended claims cover all such modifications as fall within the true spirit and scope of the invention.

INDUSTRIAL APPLICABILITY

As above, the dome type camera according to the invention has an advantage that good images can be obtained in the direction of a depression angle, and it is useful as a surveillance camera or the like.

The invention claimed is:

1. A dome type camera comprising: a dome cover; a lens provided inside said dome cover rotatably in a tilt direction; a lens support structure supporting said lens so that a center of rotation of said lens can be moved from a center of a dome to a position apart therefrom in a zenith direction; and
   a lens moving mechanism for moving said lens in the zenith direction according to a rotation of said lens in the tilt direction,
   said lens moving mechanism holding a rotation axis of said lens at the center of the dome when the tilt of the lens is within a predetermined angle range corresponding to a direction of an elevation angle, and
   said lens moving mechanism moving the rotation axis of said lens from the center of the dome in the zenith direction, when the tilt of the lens is at an angle lower than said predetermined angle range.

2. The dome type camera according to claim 1, wherein said lens moving mechanism comprises a cam for moving the rotation axis to a predetermined position according to the rotation of said lens.

3. The dome type camera according to claim 2, wherein said cam is set so that the rotation axis of said lens is held at the center of the dome in said predetermined angle range corresponding to a direction of an elevation angle, and that the rotation axis of said lens is moved from the center of the dome in the zenith direction at angles lower than said predetermined angle range.

4. The dome type camera according to claim 2, wherein said cam is a plate cam attached to the rotation axis, and wherein a cam surface around a periphery of the plate cam is in contact with a fixed pressing section.

* * * * *

UNITED STATES PATENT AND TRADEMARK OFFICE
CERTIFICATE OF CORRECTION

PATENT NO. : 7,586,537 B2
APPLICATION NO. : 10/597156
DATED : September 8, 2009
INVENTOR(S) : Takayuki Konishi and Toshikazu Tatewaki It is certified that error appears in the above-identified patent and that said Letters Patent is hereby corrected as shown below:

On the title page, item [57]:
Please insert the following paragraph at the beginning of the ABSTRACT:

--A lens is rotatably provided inside a dome cover. The lens is supported so that the center of rotation can be moved from the center of a dome to a position apart therefrom in the zenith direction. A lens moving mechanism for moving the lens according to a rotation in the tilt direction of the lens may be provided.--

Signed and Sealed this

Third Day of November, 2009

David J. Kappos
*Director of the United States Patent and Trademark Office*

UNITED STATES PATENT AND TRADEMARK OFFICE
CERTIFICATE OF CORRECTION

PATENT NO.       : 7,586,537 B2
APPLICATION NO.  : 10/597156
DATED            : September 8, 2009
INVENTOR(S)      : Konishi et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 468 days.

Signed and Sealed this

Fourteenth Day of September, 2010

David J. Kappos
*Director of the United States Patent and Trademark Office*